(12) United States Patent
Tanaka et al.

(10) Patent No.: US 7,815,006 B2
(45) Date of Patent: Oct. 19, 2010

(54) SEAT BELT WINDING METHOD, SEAT BELT RETRACTOR, AND SEAT BELT APPARATUS

(75) Inventors: Koji Tanaka, Tokyo (JP); Daisuke Murakami, Tokyo (JP)

(73) Assignee: Takata Corporation, Tokyo (JP)

( * ) Notice: Subject to any disclaimer, the term of this patent is extended or adjusted under 35 U.S.C. 154(b) by 101 days.

(21) Appl. No.: 12/309,396

(22) PCT Filed: Jul. 6, 2007

(86) PCT No.: PCT/JP2007/063565

§ 371 (c)(1),
(2), (4) Date: Jan. 16, 2009

(87) PCT Pub. No.: WO2008/015872

PCT Pub. Date: Feb. 7, 2008

(65) Prior Publication Data

US 2009/0243367 A1    Oct. 1, 2009

(30) Foreign Application Priority Data

Aug. 2, 2006 (JP) .............................. 2006/211257

(51) Int. Cl.
*B60R 21/00* (2006.01)
(52) U.S. Cl. .................. 180/268; 280/802; 280/806; 701/45
(58) Field of Classification Search .............. 180/268; 280/802, 803, 806; 701/45
See application file for complete search history.

(56) References Cited

U.S. PATENT DOCUMENTS

| | | | |
|---|---|---|---|
| 4,714,274 A * | 12/1987 | Nagashima | 280/801.1 |
| 6,726,249 B2 * | 4/2004 | Yano et al. | 280/805 |
| 6,767,031 B2 * | 7/2004 | Yamamoto | 280/806 |
| 7,077,231 B2 * | 7/2006 | Midorikawa | 180/268 |
| 7,631,720 B2 * | 12/2009 | Takao et al. | 180/268 |
| 7,681,683 B2 * | 3/2010 | Takao et al. | 180/268 |
| 2001/0025735 A1 * | 10/2001 | Midorikawa et al. | 180/268 |
| 2007/0084955 A1 * | 4/2007 | Tanaka et al. | 242/374 |
| 2007/0144811 A1 * | 6/2007 | Tanaka et al. | 180/268 |
| 2008/0238076 A1 * | 10/2008 | Takao et al. | 280/807 |

FOREIGN PATENT DOCUMENTS

| | | |
|---|---|---|
| JP | 2005-219535 A | 8/2005 |
| JP | 2005-280497 A | 10/2005 |
| JP | 2006-69334 A | 3/2006 |

\* cited by examiner

*Primary Examiner*—Toan C To
(74) *Attorney, Agent, or Firm*—Foley & Lardner LLP (57) ABSTRACT

To provide a seat belt winding method, a seat belt retractor, and a seat belt apparatus capable of stopping the motor even when the seat belt is being wound and restarting the winding of the seat belt, and capable of reducing excess repetition of stopping and starting of the motor.

A seat belt winding method comprises a start signal detecting step (S1) for detecting a buckle release signal, a starting step (S2) for actuating a motor based on a buckle release signal, an overload detecting step (S3) for detecting overload on the motor, a stopping step (S4) for stopping the motor when overload is detected, a waiting step (S5) for stopping the motor for a certain period of time, a storage checking step (S6) for checking the completion of the winding of the seat belt after a lapse of the certain period of time, and a restart determining step (S7) for counting up the number of times the motor is restarted and terminating the winding operation of the seat belt (S8) when the number of times the motor is restarted reaches a predetermined value.

18 Claims, 7 Drawing Sheets

SEAT BELT WINDING METHOD, SEAT BELT RETRACTOR, AND SEAT BELT APPARATUS

TECHNICAL FIELD

The present invention relates to a seat belt winding method for a seat belt apparatus in which a seat belt is wound up by means of a motor, and relates to a seat belt retractor and a seat belt apparatus for carrying out the seat belt winding method. More particularly, the present invention relates to a seat belt winding method, a seat belt retractor, and a seat belt apparatus for preventing excess repetition of winding operation.

BACKGROUND ART

Conventionally typical seat belt apparatus comprises: a seat belt for restraining an occupant, a seat belt retractor for winding up the seat belt in such a manner as to allow the seat belt to be withdrawn, a tongue which is slidably supported by the seat belt, and a buckle which can be latched with the tongue, and the seat belt apparatus is adapted to restrain the occupant to a vehicle seat when the tongue is pulled and then latched with the buckle by the occupant.

As the aforementioned seat belt retractor, there is a seat belt retractor comprising a spool onto which the seat belt is wound, and a motor for rotating the spool. The seat belt retractor is employed for satisfying needs such as securely winding up the excessively withdrawn seat belt to fit the occupant's body, winding up the withdrawn seat belt until the seat belt is fully accommodated in an storage portion when nobody wears the seat belt, and not making the occupant feel pressure on his or her chest or the like when the occupant normally wears the seat belt. For example, the seat belt apparatus disclosed in Patent document 1 comprises such a motor of which rotational speed is controlled according to ON/OFF of a buckle switch and ON/OFF of a seat belt wearing signal.

It is an object of the invention disclosed in Patent document 1 to provide a seat belt apparatus which accurately determines an interruption of withdrawal so as to wind up the seat belt even when the seat belt is on the way of being withdrawn, thereby preventing the occupant from feeling some pressure due to unnecessary increase of belt tension and thus improving its marketability. Therefore, the seat belt apparatus has a motor speed control means which actuates the motor when a predetermined state is detected that the seat belt is still not worn a lapse of a certain period of time after the start of withdrawing the seat belt by a belt withdrawal detecting means and a belt wearing detecting means, so as to wind up the seat belt. The motor in operation is stopped when the completion of seat belt winding operation is detected by the belt withdrawal detecting means.

Patent document 1: JP2005-219535A

DISCLOSURE OF THE INVENTION

Problems to be Solved by the Invention

However, the seat belt apparatus disclosed in Patent document 1 is made without considering a case that a tongue is caught by an occupant or a vehicle structural object (for example, a vehicle seat or a door) during the winding of the seat belt by actuation of the motor and a case that the occupant pulls the seat belt in order to wear the seat belt again during the winding of the seat belt by actuation of the motor and thus does not include an idea of stopping the motor in operation before the completion of seat belt winding operation after the motor is actuated. Further, the seat belt withdrawal detecting means detects the completion of seat belt winding operation only for the purpose of stopping the motor in operation.

If the motor is stopped when the tongue is caught by the occupant or the vehicle structural object (for example, a vehicle seat or a door) during the winding of the seat belt by actuation of the motor or when the occupant pulls the seat belt to wear the seat belt again during the winding of the seat belt by actuation of the motor, the motor must be actuated again because it is required in order to remove a seat belt slack after the occupant undoes the catch of the seat belt or after the occupant wears the seat belt again.

Further, it is also required to completely stop the motor to terminate the seat belt winding operation at a suitable timing. As the motor continues operating or being in an operable state indefinitely when the occupant gets off the vehicle with the tongue being caught by a vehicle structural object (for example, a vehicle seat or a door) or when the occupant wears the seat belt again, there are problems that power of a battery is uselessly consumed, that repetition of stopping and starting of the motor makes the occupant feel discomfort, that operation noise due to the repetition of stopping and starting of the motor annoys the occupant, and the like.

The present invention was made in view of the aforementioned problems and an object of the present invention is to provide a seat belt winding method, a seat belt retractor, and a seat belt apparatus capable of stopping the motor even when the motor is actuated to wind up a seat belt, capable of restarting the motor, and capable of reducing the repetition of stopping and starting of the motor.

Means for Solving the Problems

According to the present invention, there is provided a seat belt winding method for a seat belt apparatus having a motor for winding up a seat belt, comprising: a start signal detecting step of detecting a start signal for actuating said motor; a starting step of actuating said motor according to the start signal; an overload detecting step of detecting overload in said motor in operation; a stopping step of stopping said motor when overload is detected; a waiting step of keeping said motor in the stopped state for a certain period of time; a storage checking step of checking whether or not the winding of said seat belt is completed after a lapse of said certain period of time; and a restart determining step of proceeding to said starting step when the winding of the seat belt is not completed and counting up number of times said motor is restarted to terminate the winding operation of said seat belt when the number of times said motor is restarted reaches a predetermined value. Said storage checking step may terminate the winding operation of said seat belt without carrying out said restart determining step when the winding of said seat belt is completed.

The method may further comprise a wait cancelling step of proceeding to said starting step when a wait cancelling signal is detected during said waiting step and may further comprise a restart cancelling step of terminating the winding operation of said seat belt when a seat belt wearing signal is detected during said waiting step. Moreover, the method may further comprise a previous storage checking step of checking whether or not the winding of said seat belt is completed just after said start signal detecting step and proceeding to said starting step when the winding of said seat belt is not completed.

Said start signal may be a signal for detecting the wearing state of said seat belt or the opening state of a vehicle door.

Also according to the present invention, there is provided a seat belt retractor having a spool for winding up a seat belt and a motor for rotating said spool, and comprising: a start signal receiving means for receiving a start signal for actuating said motor; an overload detecting means for detecting overload in said motor; a storage checking means for checking whether or not the winding of said seat belt is completed; and a motor control means for controlling the operation of said motor, wherein said motor control means actuates said motor when a start signal for actuating said motor is received, stops said motor when overload is detected by said overload detecting means and keeps said motor in the stopped state for a certain period of time, restarts said motor according to a signal from said storage checking means when the winding of said seat belt is not completed after a lapse of the certain period of time, and terminates the winding operation of said seat belt when the number of times said motor is restarted reaches a predetermined value. Said motor control means may be adapted to terminate the winding operation of said seat belt without restarting said motor according to a signal from said storage checking means when the winding of said seat belt is completed.

Further, said motor control means may be adapted to restart said motor rather than waiting a lapse of the certain period of time when receiving a wait cancelling signal and may be adapted to terminates the winding operation of said seat belt rather than waiting a lapse of said certain period of time when receiving a seat belt wearing signal. Furthermore, said motor control means may be adapted to check by said storage checking means whether or not the winding of said seat belt is completed after receiving a start signal for starting said motor and starts said motor when the winding of said seat belt is not completed. Said start signal may be a signal for detecting the wearing state of said seat belt or the opening state of a vehicle door.

Also according to the present invention, there is provided a seat belt apparatus comprising a seat belt for restraining an occupant, a seat belt retractor for winding up said seat belt in such a manner as to allow said seat belt to be withdrawn, a tongue which is slidably supported by said seat belt, and a buckle which is fixed to a vehicle structural object and can be latched with said tongue, wherein said seat belt retractor is a seat belt retractor as described above.

EFFECT OF THE INVENTION

According to the aforementioned seat belt winding method, the aforementioned seat belt retractor, and the aforementioned seat belt apparatus of the present invention, it is possible to stop the motor even when the motor is in operation of winding up the seat belt and to restart the motor, and it is possible to reduce repetition of stopping and starting of the motor. Therefore, it is possible to exhibit excellent effects of reducing the chance of making the occupant feel discomfort and reducing the chance of making the occupant feel vexatiousness due to operation noise generated by the repetition of stopping and starting of the motor.

BEST MODE FOR CARRYING OUT THE INVENTION

Figure 1:
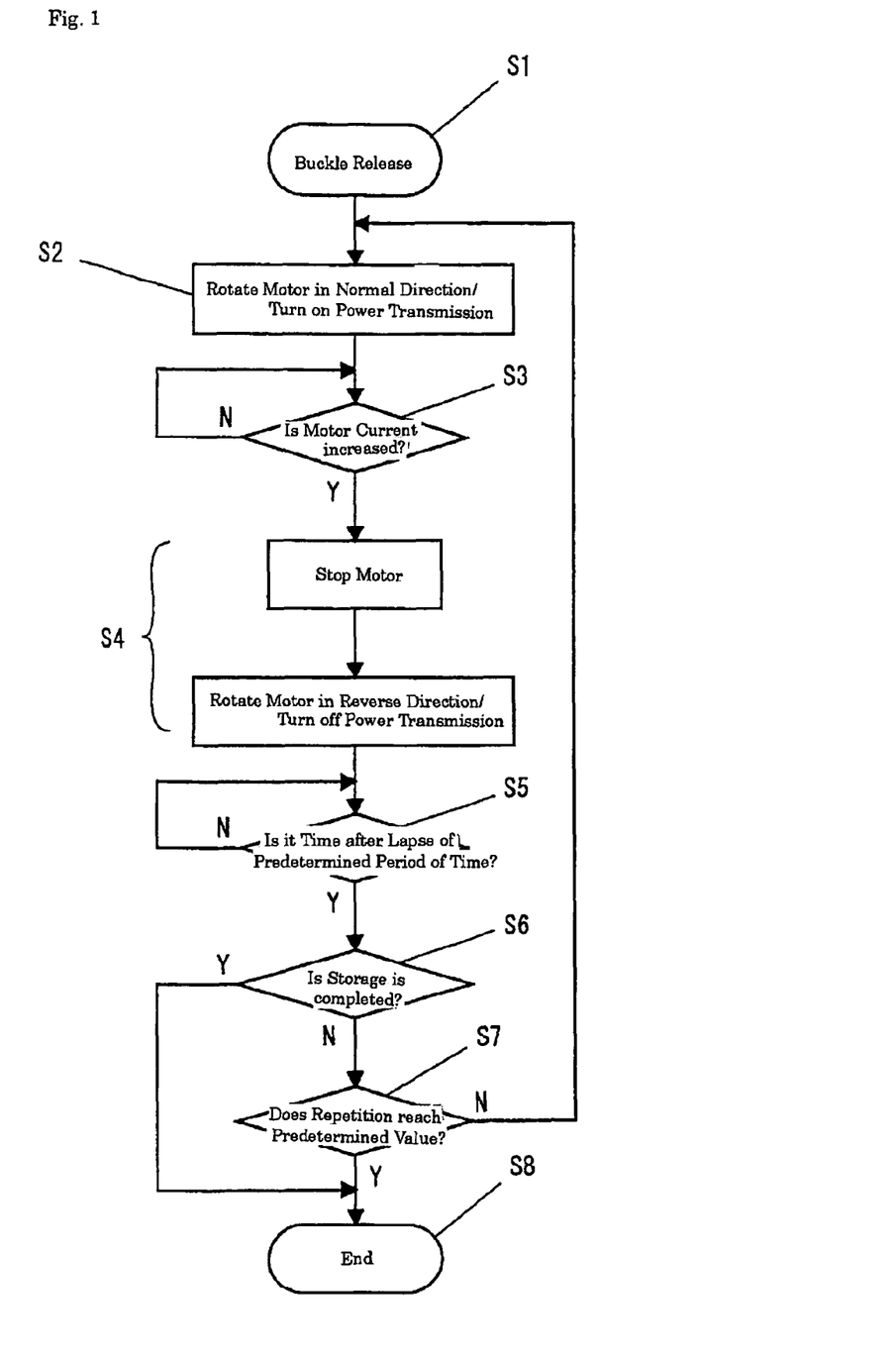
FIG. 1 is a flow chart of the first embodiment, employing the seat belt winding method of the present invention, for a case where the occupant gets off the vehicle.
Figure 2:
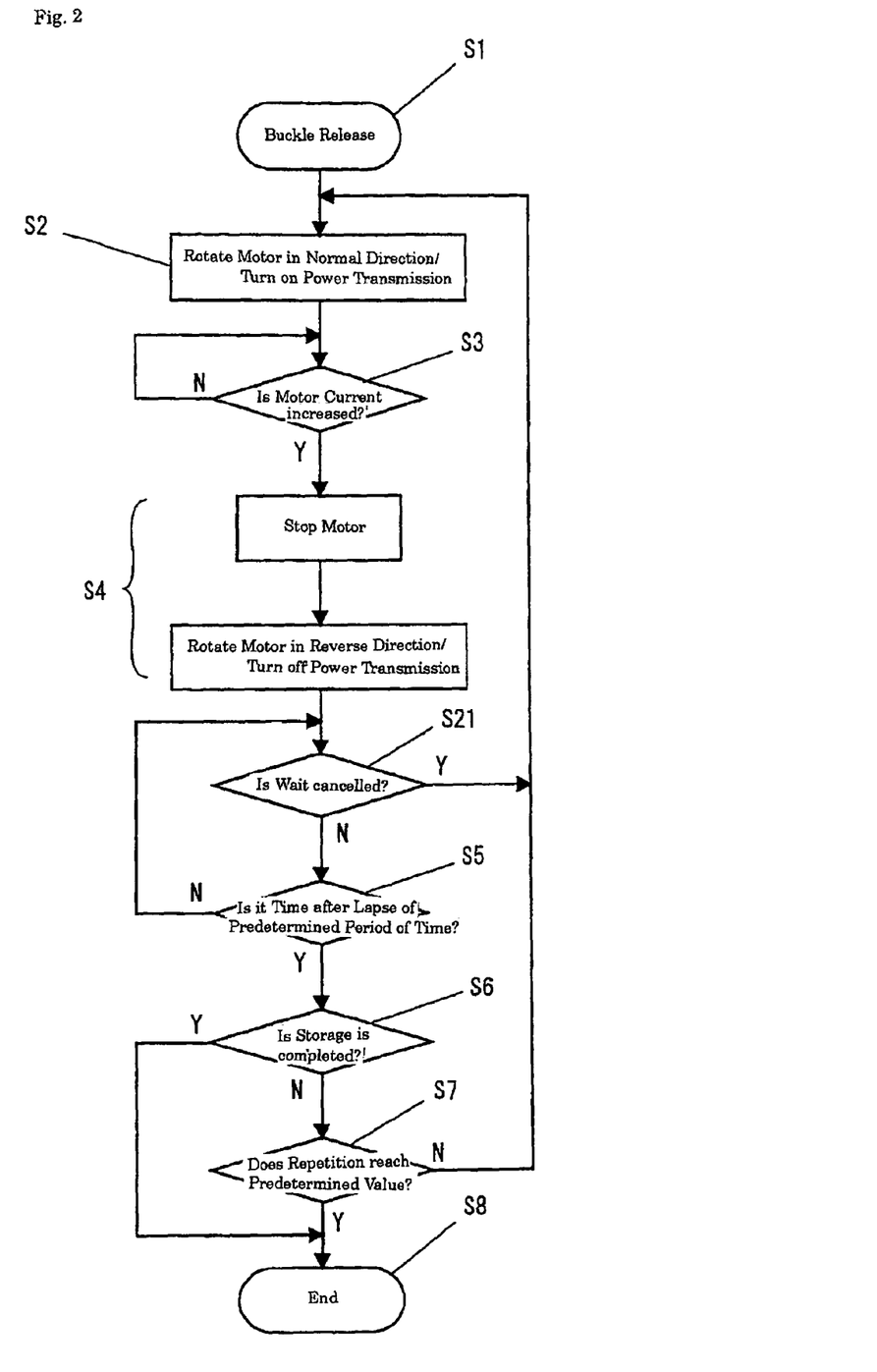
FIG. 2 is a flow chart of the second embodiment, employing the seat belt winding method of the present invention, for a case where the occupant gets off the vehicle.
Figure 3:
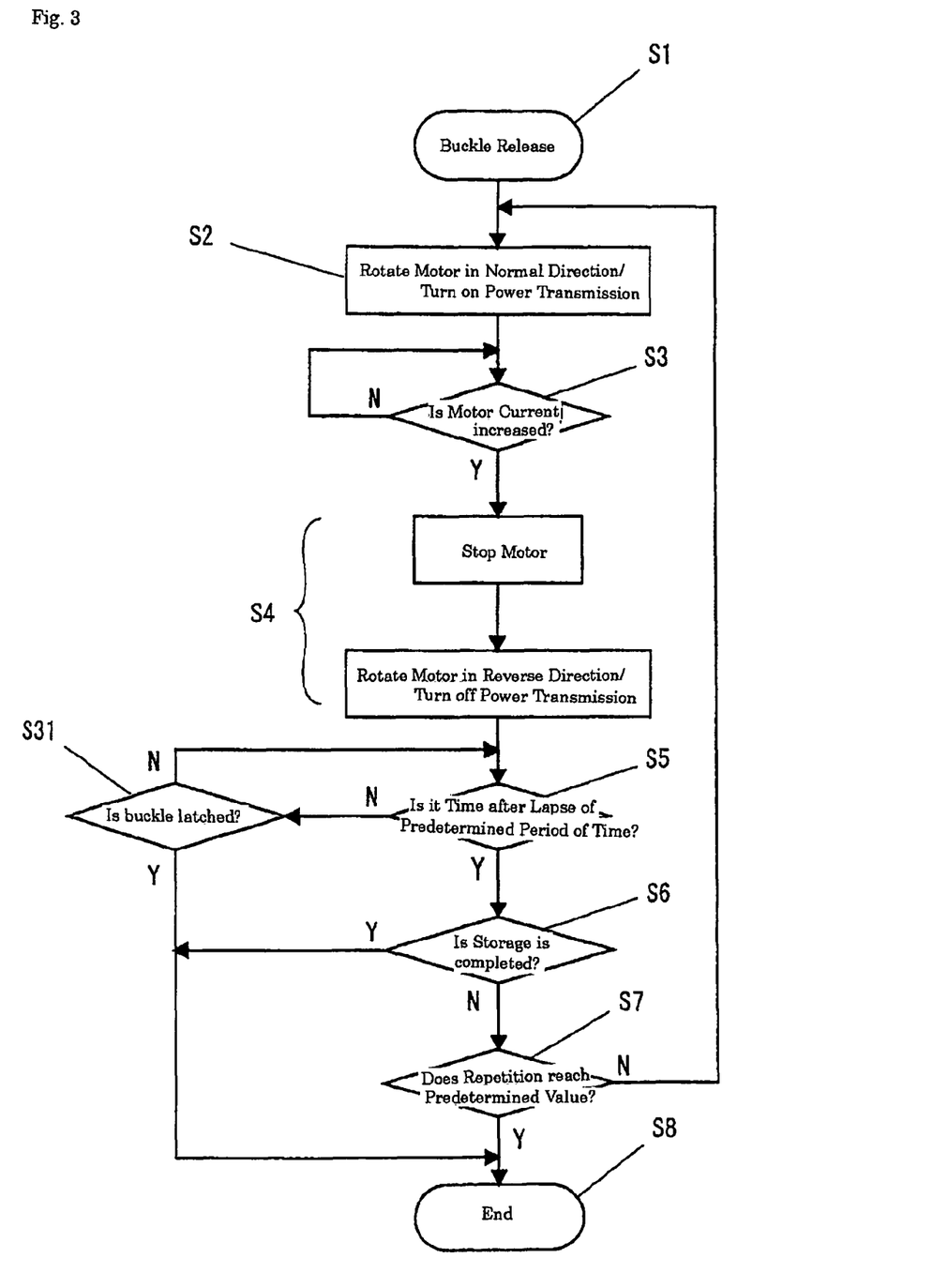
FIG. 3 is a flow chart of the third embodiment, employing the seat belt winding method of the present invention, for a case where the occupant gets off the vehicle.
Figure 4:
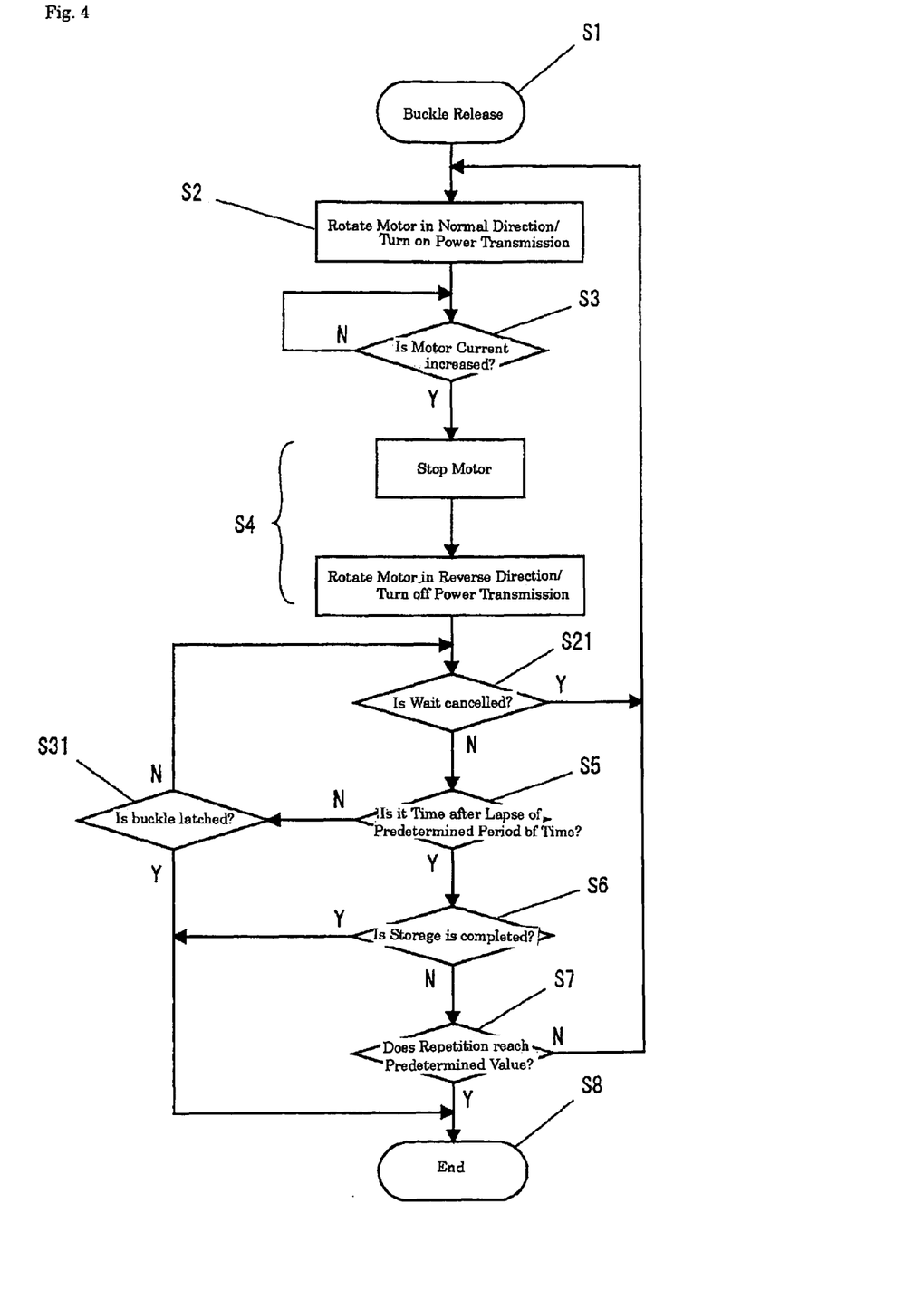
FIG. 4 is a flow chart of the fourth embodiment, employing the seat belt winding method of the present invention, for a case where the occupant gets off the vehicle.
Figure 5:
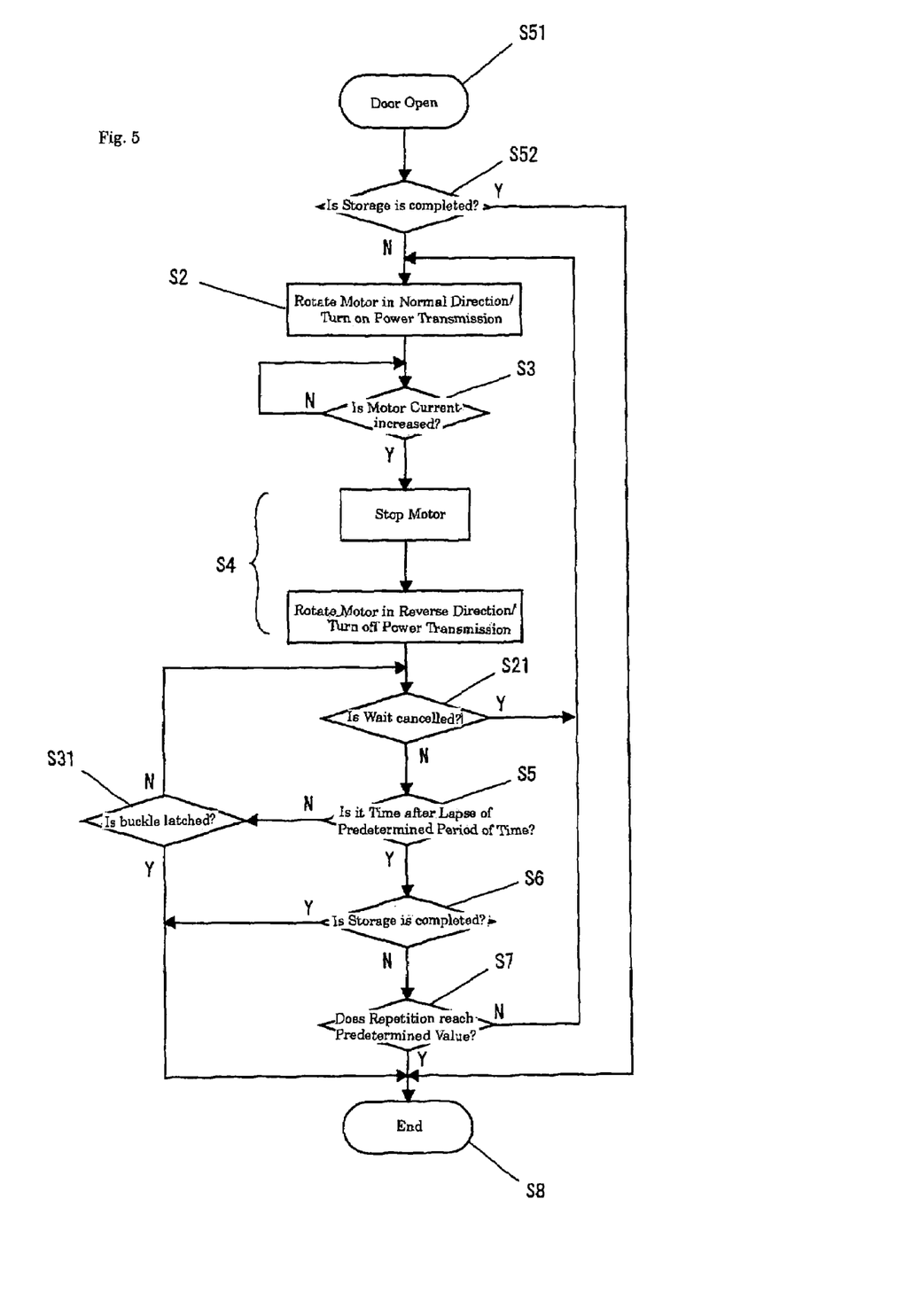
FIG. 5 is a flow chart of the embodiment, employing the seat belt winding method of the present invention, for a case where the occupant gets on the vehicle.

Hereinafter, embodiments of the present invention will be described with reference to FIG. 1 through FIG. 7. FIG. 1 is a flow chart of a first embodiment employing a seat belt winding method of the present invention, FIG. 2 is a flow chart of a second embodiment thereof, FIG. 3 is a flow chart of a third embodiment thereof, FIG. 4 is a flow chart of a fourth embodiment thereof, and FIG. 5 is a flow chart of a fifth embodiment thereof.

As shown in FIG. 1, the seat belt winding method of the present invention comprises a start signal detecting step (S1) of detecting a buckle release signal for starting a motor, a starting step (S2) of starting the motor according to the buckle release signal, an overload detecting step (S3) of detecting the occurrence of an overload on the motor in operation, a stopping step (S4) of stopping the operation of the motor when an overload is detected, a waiting step (S5) of keeping the motor being in the stopped state for a certain period of time, an storage checking step (S6) of checking whether or not the winding of the seat belt is completed after a lapse of the certain period of time, a restart determining step (S7) of proceeding to the starting step when the winding of the seat belt is not completed and counting up the number of times the motor is restarted and terminating the seat belt winding operation (S8) when the number of times the motor is restarted reaches a predetermined value.

The start signal detecting step (S1) is a step for detecting trigger for starting the winding of the seat belt. Since the start signal for the motor is a buckle release signal in this embodiment, the flow chart indicates a sequence in case where the occupant takes off the seat belt, which was worn for example during running of the vehicle, for the purpose of getting off the vehicle. The buckle release signal is a signal generated when latching between a tongue and a buckle of the seat belt is released. As the buckle release signal is detected (received), the process proceeds to the next step.

The starting step (S2) is a step for rotating the motor for winding up the seat belt in the normal rotational direction (in a direction of winding up the seat belt). At this point, a power transmission path between the motor and the spool onto which the seat belt is wound may be disconnected. In this case, it is required to connect (turn ON) the power transmission path, for example, by actuating a clutch mechanism in a case where the power transmission path is disconnected by the clutch mechanism, or by rotating the motor in the normal rotational direction in a case where the power transmission path is connected (turned ON) by rotating the motor in the normal rotational direction.

The overload detecting step (S3) is a step for detecting the occurrence of an overload on the motor during the winding of the seat belt. The determination whether or not overload occurs is made by monitoring whether or not the current of the motor is increased to a predetermined level. When the current is increased to the predetermined level, it is determined that overload occurs. Further, the determination whether or not overload occurs can be also made directly or indirectly by detecting variation in torque of the motor, increase in temperature of the motor, tension on the seat belt, distortion of the spool, or the like. When overload on the motor is detected (Y) in the overload detecting step (S3), the process proceeds to the next step. When overload on the motor is not detected (N), the motor is continuously rotated in the normal rotational direction to continue the winding of the seat belt.

When overload occurs on the motor after the buckle is released, there are possible cases that the seat belt or the tongue is caught by the occupant or a vehicle structural object (for example, a vehicle seat or a door), that the occupant pulls the seat belt for the purpose of wearing the seat belt again, and the like. If the motor continues operating (winding up the seat belt) in such a case, load or resistance is applied to the occupant who undoes the catch of the seat belt or wears the seat belt again (pulls the seat belt again). If the occupant does not notice the catch of the seat belt and gets off the vehicle, the motor is left being operating. Therefore, when overload occurs on the motor, overload on the motor is monitored in the over load detecting step (S3) for the purpose of temporally stopping the operation of the motor.

The stopping step (S4) is a step for stopping the operation (rotation) of the motor when overload on the motor is detected. At this point, the power transmission path between the motor and the spool may be disconnected or, as shown in FIG. 1, the power transmission path may be disconnected by rotating the motor in a reverse direction (in a direction of withdrawing the seat belt). The reason to disconnect the power transmission path is to prevent the motor from acting as load or resistance when the occupant undoes the catch of the seat belt or pulls the seat belt again. Besides the method of rotating the motor in the reverse direction, there is another way for disconnecting the power transmission path, such as a method of disconnecting a clutch mechanism, so that the way for disconnecting the power transmission path is not limited to the method shown in FIG. 1.

The waiting step (S5) is a step for keeping the motor to be stopped for a certain period of time. Keeping the state of the motor for the certain period of time after stopping the motor secures sufficient time for allowing the occupant to undo the catch of the seat belt or to wear the seat belt again. The reason to set a limit on waiting time to the certain period of time is because it is required to remove seat belt slack after the occupant undoes the catch of the seat belt or the occupant wears the seat belt again. Therefore, the certain period of time must be longer than the time required for the occupant to undo the catch of the seat belt or for the occupant to wear the seat belt again. For example, several seconds may be sufficient as the certain period of time, but the certain period of time may be set by statistically calculating such period of time or may be set optionally by the occupant or a vehicle owner. When it is time after a lapse of the predetermined period of time (Y) in the waiting step (S5), the process proceeds to the next step so as to restart the motor. When it is time before a lapse of the certain period of time (N), the motor is kept to be stopped.

The storage checking step (S6) is a step for checking whether or not the winding of the seat belt is completed. Here, the state where "the winding of the seat belt is completed" includes a state where the seat belt is completely stored and a state where the seat belt is nearly completely stored. The determination whether or not the winding of the seat belt is completed is made by monitoring the rotational amount of the spool, detection of a predetermined position of the seat belt, the thickness of the seat belt wound around the spool, or the tension on the seat belt. Specifically, for example, a retractor switch which is turned ON/OFF according to the rotation amount of the spool may be employed. The reason to check the storage state of the seat belt before restarting the motor is because it is not required to restart the motor if the winding of the seat belt is already completed. When the winding of the seat belt is completed (Y) in the storage checking step (S6), the seat belt winding operation is terminated (S8) even if the number of times the motor is restarted is not up to a predetermined value. Therefore, the storage checking step (S6) can reduce the excess number of restarting the motor, thereby reducing the chance of making the occupant feel discomfort and reducing the chance of making the occupant feel vexatiousness due to operation noise. When the winding of the seat belt is not completed (N), the process proceeds to the next step to restart the motor.

The restart determining step (S7) is a step for counting up the number of times the motor is restarted to determine whether or not it is required to restart the motor. When the number of times the motor is restarted is not up to the predetermined value (for example, three) (N) in the restart determining step (S7), the process proceeds to the starting step (S2) so as to restart the motor. When the number of times the motor is restarted reaches the predetermined value (Y), the seat belt winding operation is terminated (S8) and the motor will be kept stopped until a next start signal is detected.

The winding method of the present invention can respond to a case where the seat belt is caught by the occupant or the vehicle structural object and a case where the occupant pulls the seat belt to wear the seat belt again, without providing an additional special sensor, because the motor is controlled not to be restarted after the number of repetitions of stopping and starting of the motor reaches the predetermined value. The predetermined value is set taking the followings into consideration, that is, (1) since there may be one or two chances at most that the seat belt is caught until the winding of the seat belt is completed, more number of repetitions should be enough, and (2) since overload always occurs on the motor if the occupant wears the seat belt again or the occupant does not notice the catch of the seat belt and gets off the vehicle, the repetition of restarting of the motor in this state not only makes the occupant feel discomfort or vexatiousness but also uselessly consumes power of a battery.

Now, the second embodiment employing the seat belt winding method of the present invention will be described with reference to FIG. 2. In the second embodiment, the same steps as those in the first embodiment are marked with the same step numbers to omit duplicative description about the steps. In the second embodiment, a wait cancelling step (S21) is inserted into a sequence for keeping the waiting state of the waiting step (S5).

The wait cancelling step (S21) is a step for proceeding to the starting step (S2) rather than waiting a lapse of the certain period of time when a wait cancelling signal is detected during the waiting step (S5). Therefore, the storage checking step (S6) and the restart determining step (S7) are omitted. When no wait cancelling signal is detected (N), the process returns to the normal sequence. The reason is because, when a door is opened, an engine is stopped, or the occupant leaves the vehicle seat in the waiting state where the motor is stopped, there will be no problem if the motor is immediately restarted to start the winding of the seat belt again. The wait cancelling signal is, for example, a signal detected by a door switch, an ignition switch, a seat load measuring instrument, or the like. The wait cancelling step (S21) is active only when a wait cancelling signal is detected. A case where the state is kept without change (for example, the engine is kept stopped) falls under "when no wait cancelling signal is detected (N)" so that the motor is controlled according to the normal sequence also in this case. The wait cancelling step (S21) can eliminate wasting waiting time.

Now, the third embodiment employing the seat belt winding method of the present invention will be described with reference to FIG. 3. In the third embodiment, the same steps as those in the first embodiment are marked with the same step numbers to omit duplicative description about the steps. In the third embodiment, a restart cancelling step (S31) is inserted into a sequence for keeping the waiting state of the waiting step (S5).

The restart cancelling step (S31) is a step for terminating the seat belt winding operation (S8) rather than waiting a lapse of the certain period of time when a seat belt wearing signal is detected during the waiting step (S5). Therefore, the storage checking step (S6) and the restart determining step (S7) are omitted. When no seat belt wearing signal is detected (N), the process returns to the normal sequence. The reason is because, when the occupant wears the seat belt (latches the tongue to the buckle) in the waiting state where the motor is stopped, there will be no problem if the sequence for restarting the motor is immediately terminated. The seat belt wearing signal is, for example, a signal detected by a buckle switch, or the like. The restart cancelling step (S31) can reduce the excess number of restarting the motor, thereby reducing the chance of making the occupant feel discomfort or vexatiousness.

Now, the fourth embodiment employing the seat belt winding method of the present invention will be described with reference to FIG. 4. In the fourth embodiment, the same steps as those in the first embodiment through the third embodiment are marked with the same step numbers to omit duplicative description about the steps. In the fourth embodiment, the wait cancelling step (S21) and the restart cancelling step (S31) are inserted into a sequence for keeping the waiting state of the waiting step (S5). That is, the fourth embodiment is a combination of all sequences of the first embodiment through the third embodiment.

According to the seat belt winding method of the fourth embodiment, in the wait cancelling step (S21) after stopping step (S4), it is checked whether or not a wait cancelling signal exists. When the wait cancelling signal is detected (Y), the process proceeds to the starting step (S2). When no wait cancelling signal is detected (N), the process proceeds to the waiting step (S5). In the waiting step (S5), it is checked whether or not it is time after a lapse of the certain period of time. When it is time after a lapse of the certain period of time (Y), the process proceeds to the storage checking step (S6). When it is time before a lapse of the certain period of time (N), the process proceeds to the restart cancelling step (S31). In the restart cancelling step (S31), it is checked whether or not a seat belt wearing signal exists. When no seat belt wearing signal is detected (N), the process proceeds to a stage just before the wait cancelling step (S21). When the seat belt wearing signal is detected (Y), the seat belt winding operation is terminated (S8) and the motor is kept stopped until a next start signal is detected.

Now, the fifth embodiment employing the seat belt winding method of the present invention will be described with reference to FIG. 5. In the fifth embodiment, the same steps as those in the fourth embodiment are marked with the same step numbers to omit duplicative description about the steps. The fifth embodiment is a sequence having a start signal receiving (sic) step (S51) in which a door open signal is used as the start signal in the start signal detecting step (S1) of the fourth embodiment.

The start signal detecting step (S51) is a step for detecting trigger for starting the winding of the seat belt in a state where the sequence of the seat belt winding method is terminated. Since the start signal for the motor is a door opening signal in this embodiment, the flow chart indicates a sequence in case where the occupant gets on the vehicle and is about to wear the seat belt. The door opening signal is a signal generated when the vehicle door is opened. As the buckle release signal (sic) is detected (received), the process proceeds to the next step. The door opening signal is detected also when the occupant gets off the vehicle. However, since the sequence of the seat belt winding method of the present invention, in which the buckle release signal is used as the start signal, is normally working when the occupant gets off the vehicle, the door opening signal is processed to function as the wait cancelling signal.

Inserted as a next step of the start signal detecting step (S51) is a previous storage checking step (S52) for checking whether or not the seat belt is completely wound up. When the seat belt is completely wound up (Y) in the previous storage checking step (S52), the seat belt winding operation is terminated (S8). When the seat belt is not completely wound up (N), the process proceeds to the starting step (S2) so as to start the motor. Since the previous storage checking step (S52) is basically the same step as the aforementioned storage checking step (S6) except for the inserting position, the duplicative description about the previous storage checking step (S52) will be omitted.

The reason to insert the previous storage checking step (S52) is because the restart of the motor is not conducted after the restart of the motor has been repeated a predetermined number of times according to the seat belt winding method of any of the first embodiment through the fourth embodiment, but there may be a case where the winding of the seat belt is not completed for some reason. For example, there may be a case where the occupant gets off the vehicle with the seat belt being caught by the vehicle seat or the door and a case where the seat belt is caught in the door while the occupant gets off the vehicle. In such a case, the occupant may release the seat belt from the door or undoes the catch of the seat belt while the occupant gets on the vehicle. It is better to remove seat belt slack or loose to make the seat belt be in a state that the winding is completed, because of better subsequent operation of the seat belt.

When the seat belt winding method shown in FIG. 5 is carried out because of detection of the door opening signal, it can be assumed that the occupant takes operation of wearing the seat belt. In this case, overload of the motor is caused by the occupant catching or pulling the seat belt. Therefore, the winding of the seat belt is stopped by the overload detecting step (S3). As the seat belt is worn during the stop of the motor, the seat belt winding operation is terminated (S8) by the restart cancelling step (S31). When the door opening signal is set as the start signal for the motor, it never makes the occupant feel discomfort even with the previous storage checking step (S52). Depending on the setting on detection value (for example, predetermined value of the motor current) of overload in the overload detecting step (S3), the seat belt slack can be removed when the occupant wears the seat belt, to fit the seat belt to the occupant.

Though the case where the door opening signal is set as the start signal for the motor has been described as a variation of the fourth embodiment having both the wait cancelling step (S21) and the restart cancelling step (S31), the present invention is not limited thereto and can be applied to a case not having both of the wait cancelling step (S21) and the restart cancelling step (S31) (a variation of the first embodiment), a case having only the wait cancelling step (S21) (a variation of the second embodiment), a case having only the restart cancelling step (S31) (a variation of the third embodiment). The previous storage checking step (S52) may be omitted.

Figure 6:
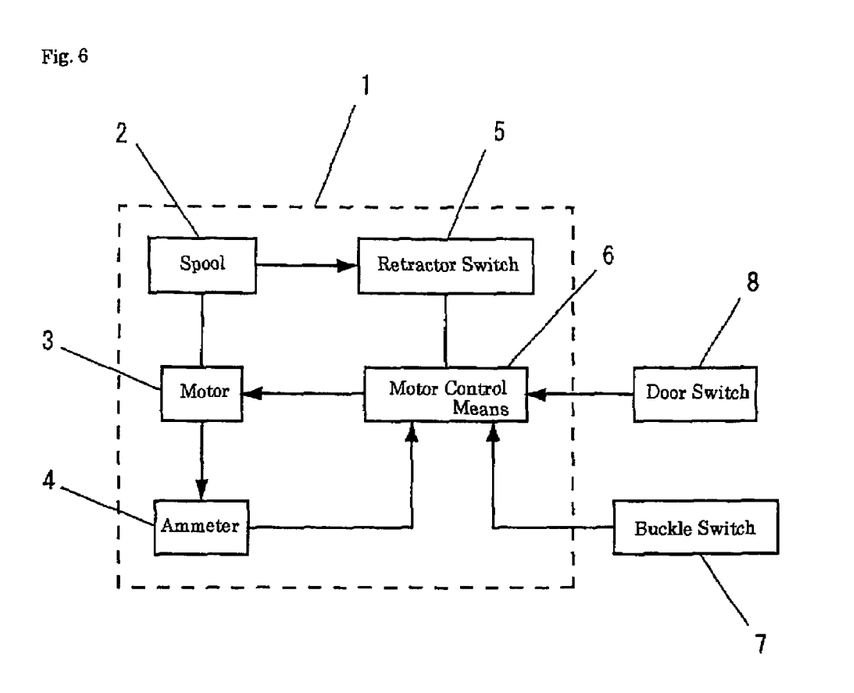
FIG. 6 is a structural conceptual diagram of the seat belt retractor of the present invention.

Then, a seat belt retractor and a seat belt apparatus for carrying out the seat belt winding method of the present invention will be described with reference to FIG. 6. FIG. 6 is a structural conceptual diagram of the seat belt retractor of the present invention.

The seat belt retractor 1 of the present invention comprises a spool 2 for winding up a seat belt, a motor 3 for rotating the spool 2, an ammeter 4 (overload detecting means) for detecting the occurrence of an overload (overcurrent) on the motor 3, a retractor switch 5 (storage checking means) for checking whether or not the winding of the seat belt is completed, and a motor control means 6 for controlling the operation of the motor 3. The motor control means 6 controls the motor 3 according to the sequence of the seat belt winding method of the present invention as mentioned above. Therefore, the seat belt retractor 1 can carry out the seat belt winding method of the present invention and have the same effects as the seat belt winding method. A buckle switch 7 is disposed on the buckle attached to a vehicle body or a vehicle seat and a door switch 8 is disposed to the vehicle body.

In case of employing the sequence of the first embodiment as shown in FIG. 1, the motor control means 6 actuates the motor 3 when receiving a buckle release signal (stat signal) from the buckle switch 7, stops the motor 3 when overload is detected by the ammeter 4 (overload detecting means) and then keeps the motor 3 in the stopped state for a certain period of time, restarts the motor 3 according to a signal from a retractor switch 5 (storage checking means) after a lapse of the certain period of time when the winding of the seat belt is not completed, and terminates the winding operation of the seat belt when the number of times the motor 3 is restarted reaches the predetermined value. It should be noted that, instead of the ammeter 4, a device capable of detecting variation in torque of the motor, increase in temperature of the motor, tension on the seat belt, distortion of the spool, or the like may be employed as the overload detecting means so as to directly or indirectly detect whether or not overload occurs on the motor.

In case of employing the sequence of the fourth embodiment as shown in FIG. 4, the motor control means restarts the motor 3 without waiting a lapse of the certain period of time when receiving a door opening signal (weight cancelling signal) from the door switch 8, and terminates the winding operation of the seat belt without waiting a lapse of the certain period of time when receiving a buckle latch signal (seat belt wearing signal) from the buckle switch 7. The weight cancelling signal may be a signal from an ignition switch or a seat load measuring instrument instead of or in addition to the signal from the door switch 8. The description about the case of employing the sequence of the second embodiment or the third embodiment will be omitted because the control is simply applied to a case where a door opening signal (wait cancelling signal) is received from the door switch 8 or a case where the buckle latch signal (seat belt wearing signal) is received form the buckle switch 7.

In case of employing the sequence of the fifth embodiment as shown in FIG. 5, it is checked by the retractor switch 5 (storage checking means) whether or not the winding of the seat belt is completed after receiving the door opening signal (start signal) from the door switch 8. When the winding of the seat belt is not completed, the motor 3 is started. When the winding of the seat belt is completed, the motor 3 is prevented from being started.

Figure 7:
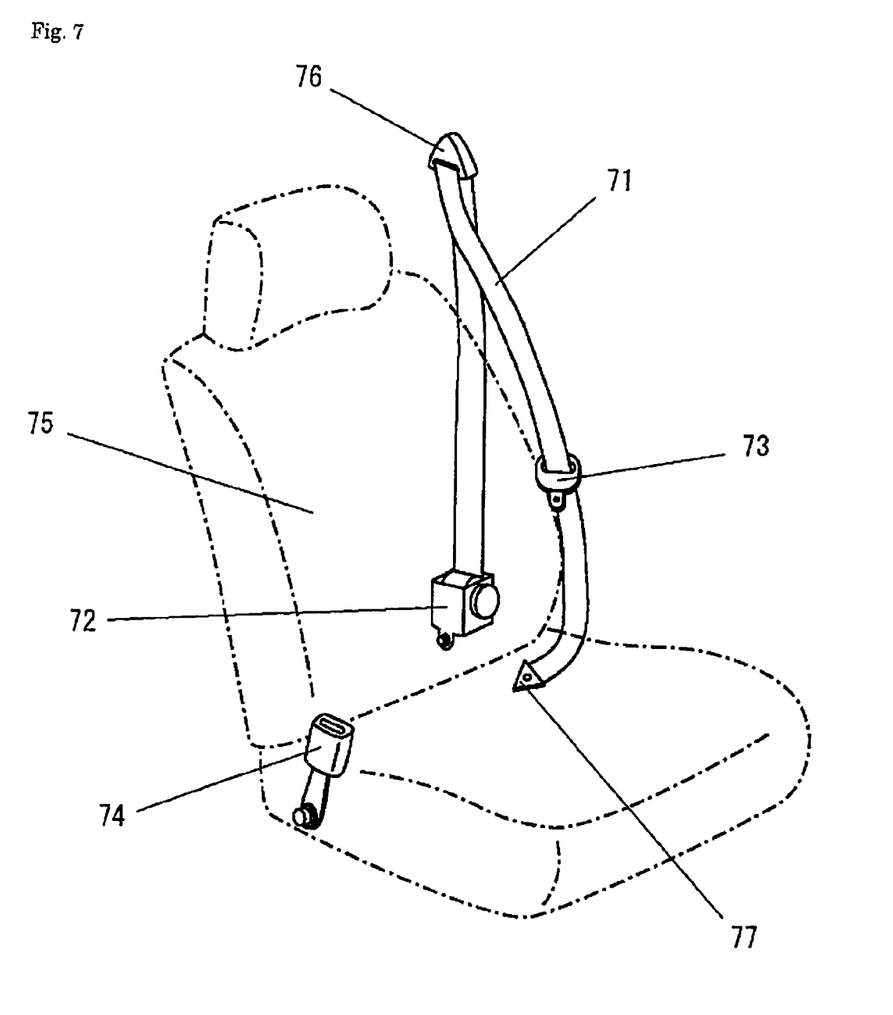
FIG. 7 is an entire schematic illustration showing an example of the seat belt apparatus of the present invention.

The aforementioned seat belt retractor 1 of the present invention can be employed in a seat belt apparatus shown in FIG. 7. FIG. 7 is an entire schematic illustration showing an example of the seat belt apparatus of the present invention. As shown in FIG. 7, the seat belt apparatus of the present invention comprises a seat belt 71 for restraining an occupant, a seat belt retractor 72 for winding up the seat belt 71 in such a manner as to allow the seat belt 71 to be withdrawn, a tongue 73 which is slidably supported by the seat belt 71, and a buckle 74 in which the tongue 73 can be latched, and restrains an occupant to a vehicle seat 75 by that the occupant pulls the tongue 73 and latches the tongue 73 into the buckle 74. The seat belt 71 extends to pass through a deflection fitting 76 which is fixed to a vehicle body (not shown) and an end of the seat belt 71 is connected to the vehicle body or the vehicle seat 75 by a belt anchor 77. In the seat belt apparatus of the present invention, the seat belt retractor 1 shown in FIG. 6 is employed as the seat belt retractor 72. Therefore, the seat belt apparatus can carry out the seat belt winding method of the present invention and has the same effects as the seat belt winding method.

It should be understood that the present invention is not limited to the aforementioned embodiments and various changes could be made without departing from the scope of the invention. For example, the present invention can be applied to a case where the occupant wears the seat belt in which the start signal of the present invention is a buckle latch signal, so as to make the seat belt fit to the occupant.

What is claimed is:

1. A seat belt winding method for a seat belt apparatus having a motor for winding up a seat belt, the method comprising:
    a start signal detecting step of detecting a start signal for actuating said motor;
    a starting step of actuating said motor according to the start signal;
    an overload detecting step of detecting the occurrence of an overload on said motor in operation;
    a stopping step of stopping said motor when overload is detected;
    a waiting step of keeping said motor in the stopped state for a certain period of time;
    a storage checking step of checking whether or not the winding of said seat belt is completed after a lapse of said certain period of time; and
    a restart determining step of proceeding to said starting step when the winding of the seat belt is not completed and counting up number of times said motor is restarted to terminate the winding operation of said seat belt when the number of times said motor is restarted reaches a predetermined value.

2. A seat belt winding method as claimed in claim 1, wherein said storage checking step terminates the winding operation of said seat belt without carrying out said restart determining step when the winding of said seat belt is completed.

3. A seat belt winding method as claimed in claim 1, further comprising a wait cancelling step of proceeding to said starting step when a wait cancelling signal is detected during said waiting step.

4. A seat belt winding method as claimed in claim 1, further comprising a restart cancelling step of terminating the winding operation of said seat belt when a seat belt wearing signal is detected during said waiting step.

5. A seat belt winding method as claimed in claim 1, further comprising a previous storage checking step of checking whether or not the winding of said seat belt is completed just after said start signal detecting step and proceeding to said starting step when the winding of said seat belt is not completed.

6. A seat belt winding method as claimed in claim 1, wherein said start signal is a signal for detecting the wearing state of said seat belt or the opening state of a vehicle door.

7. A seat belt retractor having a spool for winding up a seat belt; and a motor for rotating said spool, and comprising:
an overload detecting means for detecting the occurrence of an overload on said motor;
a storage checking means for checking whether or not the winding of said seat belt is completed; and
a motor control means for controlling the operation of said motor, wherein
said motor control means actuates said motor when a start signal for actuating said motor is received, stops said motor when overload is detected by said overload detecting means and keeps said motor in the stopped state for a certain period of time, restarts said motor according to a signal from said storage checking means when the winding of said seat belt is not completed after a lapse of the certain period of time, and terminates the winding operation of said seat belt when the number of times said motor is restarted reaches a predetermined value.

8. A seat belt retractor as claimed in claim 7, wherein said motor control means terminates the winding operation of said seat belt without restarting said motor according to a signal from said storage checking means when the winding of said seat belt is completed.

9. A seat belt retractor as claimed in claim 7, wherein said motor control means restarts said motor rather than waiting a lapse of the certain period of time when receiving a wait cancelling signal.

10. A seat belt retractor as claimed in claim 7, wherein said motor control means terminates the winding operation of said seat belt rather than waiting a lapse of said certain period of time when receiving a seat belt wearing signal.

11. A seat belt retractor as claimed in claim 7, wherein said motor control means checks by said storage checking means whether or not the winding of said seat belt is completed after receiving a start signal for starting said motor, and starts said motor when the winding of said seat belt is not completed.

12. A seat belt retractor as claimed in claim 7, wherein said start signal is a signal for detecting the wearing state of said seat belt or the opening state of a vehicle door.

13. A seat belt apparatus comprising: a seat belt for restraining an occupant, a seat belt retractor for winding up said seat belt in such a manner as to allow said seat belt to be withdrawn, a tongue which is slidably supported by said seat belt, and a buckle which is fixed to a vehicle structural object and can be latched with said tongue, wherein
said seat belt retractor has a spool on which the seat belt is wound, and a motor for rotating said spool, and comprises:
an overload detecting means for detecting the occurrence of an overload on said motor, a storage checking means for checking whether or not the winding of said seat belt is completed, and a motor control means for controlling the operation of said motor, wherein
said motor control means actuates said motor when receiving a start signal for actuating said motor, stops said motor when overload is detected by said overload detecting means, keeps said motor in the stopped state for a certain period of time, restarts said motor according to a signal from said storage checking means when the winding of said seat belt is not completed after a lapse of the certain period of time, and terminates the winding operation of said seat belt when the number of times said motor is restarted reaches a predetermined value.

14. A seat belt apparatus as claimed in claim 13, wherein said motor control means terminates the winding operation of said seat belt without restarting said motor according to a signal from said storage checking means when the winding of said seat belt is completed.

15. A seat belt apparatus as claimed in claim 13, wherein said motor control means restarts said motor rather than waiting a lapse of the certain period of time when receiving a wait cancelling signal.

16. A seat belt apparatus as claimed in claim 13, wherein said motor control means terminates the winding operation of said seat belt rather than waiting a lapse of said certain period of time when receiving a seat belt wearing signal.

17. A seat belt apparatus as claimed in claim 13, wherein said motor control means checks by said storage checking means whether or not the winding of said seat belt is completed after receiving a start signal for starting said motor, and starts said motor when the winding of said seat belt is not completed.

18. A seat belt apparatus as claimed in claim 13, wherein said start signal is a signal for detecting the wearing state of said seat belt or the opening state of a vehicle door.

* * * * *